United States Patent [19]

Cantone

[11] 4,037,544

[45] July 26, 1977

[54] AGRICULTURAL MACHINE

[76] Inventor: Natale Cantone, Via M. Prestinari, 219, Vercelli, Italy

[21] Appl. No.: 609,483

[22] Filed: Sept. 2, 1975

[30] Foreign Application Priority Data

Apr. 9, 1974 Italy .................................. 26927/74
May 30, 1975 Italy .................................. 23887/75

[51] Int. Cl.² .............................................. A01C 23/00
[52] U.S. Cl. ........................................... 111/6; 172/3; 172/7; 172/71; 172/114; 172/116; 172/292
[58] Field of Search ................... 172/114, 3, 7, 8, 116, 172/292, 71; 111/6

[56] References Cited

U.S. PATENT DOCUMENTS

| 2,044,205 | 6/1936 | Bruner | 172/71 |
| 2,793,576 | 5/1957 | Carpi | 172/114 X |
| 3,750,762 | 8/1973 | Eaton | 172/8 X |
| 3,779,320 | 12/1973 | Cantone | 172/114 X |
| 3,810,513 | 5/1974 | Spiller et al. | 172/114 |

Primary Examiner—Paul E. Shapiro
Attorney, Agent, or Firm—McGlew and Tuttle

[57] ABSTRACT

A self-propelled agricultural machine which includes a vehicle capable of automonously advancing when driven, and an assembly of implements capable of processing the soil during advancement of the vehicle. The machine includes a primary source of mechanical energy operatively connected with at least two transducers which are each individually capable of transforming the mechanical energy of the primary source into independent non-mechanical energy. The respective transducers in turn are each connected in circuit with an associated driving member wherein one of the driving members is operatively connected to the vehicle to effect the drive thereof; and the other driving member is operatively connected to the implements to effect the drive thereof, whereby the power provided by the primary source can be selectively and variably applied to either the vehicle and the implements as the vehicle is driven.

13 Claims, 6 Drawing Figures

AGRICULTURAL MACHINE

BACKGROUND OF THE INVENTION

1. Field of the Invention

The present invention generally relates to the field of mechanical soil processing means of rotary implements and more particularly, it is concerned with an agricultural maching adapted to perform mechanical processing of the soil under conditions of very high productivity and flexibility insofar as different displacements and working requirements are concerned.

2. The Prior Art

Generally, such machines, commonly called "agricultural hoes" or just "cultivators" are combined, for operation, with agricultural tractors having a weight and power suitable to the dimensions of the machines and from which the machines receive the power necessary for their advancement as well as for rotation of the implements.

An important and substantial improvement in the machines of the prior art and in the agricultural field in general has been made by the Applicant as disclosed in his U.S. Pat. No. 3,779,320 filed on Oct. 29, 1970 and granted on Dec. 18, 1973. The present invention consists of improvements to such art.

The various means, devices and arrangements of such art have enabled mainly processing of the soil to a considerably depth, such as to transform the traditional tillage, that means the actual crushing and airing of superficial clods, into a deep treatment which in practice has shown to equal a combined ploughing and harrowing action which in turn may be combined with other operations, such as for example seeding, superficial and/or deep application of fertilizers and so forth.

Moreover, the technical solutions according to said prior patent have enabled actuation and use of machines provided with hoe assemblies of a great transversal extension, i.e. capable of dealing, in each single "passage", with a large strip of soil because said technical solutions which rationally exploit the propulsive effect derived by the reaction to the forces applied during deep processing of soil, included the use of a motor of great power to drive the hoe assembly while to move forward the machine (even on the road) a motor of relatively small power was used, the whole self-propelled assembly having a power/weight ratio much higher than that of a traditional tractor/cultivator assembly; this ratio being obtained due to the fact that the machine, as mentioned above, comprises two motors only one of which is of great power (and therefore quite heavy), the energy of which is distributed in a processing or hoeing action of the soil and a thrust in a forward direction, respectively. By suitably proportioning the overall weight of the machine, the distribution of weights on the axes of the machine as well as on all the rotary implements processing the soil, and the powers of the two energy sources, it has been possible to obtain very high production outputs and predetermined ranges of conditions of consistency of the soil to be processed and practicability of the soil by the machine (that is, the drag, irrespective of the fact that the thrust necessary to overcome said drag, is due to the reaction to the tilling effect or the power imparted to the bearing wheels).

These recent developments in the field have practically introduced a new and important methodology of cultivation. There is therefore a tendency to extend this methodology and these possibilities of a high production yield, in a range of processes and soil conditions much wider than that obtained with the quipment described and shown in said U.S. Pat. No. 3,779,320.

Such prior art machines however been proved to be unsatisfactory under certain conditions and are subject to several serious limitations. As a matter of fact, the availability of more flexible machines is a long felt want. For example, certain conditions occur in cases of agricultural work, for instance on soil of poor consistency, wet but not compact and actually presenting only a slight resistance to tilling or hoeing, but on which the machine moves with a certain difficulty and in which the bearing wheels sink to a substantial depth. Frequently, there may be situations, even localized ones, in which the drag is quite high and even higher than the one taken up by the assembly of rotating implements. Similar conditions occur also when it is not intended to use the whole power available and the capacity of processing to a certain depth, of the rotary implements, but when it is intended to perform tilling only at a small depth (which requires limited energy) and in such a case it could prove useful to use the excess or at least part of the excess of energy available, in order to increase to a substantial degree the translation speed during operation with exploitation of said high power/weight ratio (reference is made specifically to said prior patent) is suited in a flexible way to the most varying operating conditions.

For example, the power of the driving motor, for advancement of the vehicle, although generally is more than enough to ensure running on the road as well as during agricultural processing of the soil (advancement which as already mentioned, is partially due and usually, mainly due, to the reaction to operation of the implements) in certain cases could prove to be insufficient; for example in cases when it is necessary to negotiate ditches or uneven soils, access ramps to the field where the work has to be performed, and so forth; it could be desirable to apply to the wheels a higher power.

Particular considerations have to be taken into account with regard to the energy distribution to the assembly of rotary implements and wheels respectively, during operation. In fact, it has been found that on consistent soils (which require a considerable amount of energy for actuation of the rotary implements, in view of the drag that said soils offer to cutting, to their breakage into clods and their crushing) and that due to the fact that they are compact before processing, they are easily practicable by the machine (offering a small drag to advancement of the heavy equipment), practically all the energy available may be applied to the rotary implements, the thrust necessary for advancement being supplied, at times even in excess, by operation of the rotary implements themselves.

In order to hypothetically attain these objects and consequently impart to the machine a suitability or flexibility of service such as to extend its working capacity to a much wider range of conditions, the machine should be provided with two motors, each one having a power sufficient to satisfy the maximum "peaks" of drags even exceptionally encountered in the most varied conditions, such motors having obviously-particularly the one used for traction — an output much lower than the maximum power delivered. It is obvious that a machine modified in such a way cannot offer the advantageous high power/weight ratio featured by the agricultural machines according to the principles disclosed in said U.S. Pat. No. 3,779,320.

Moreover, although the machines actuated according to said principles have shown to be easily controllable in their advancement speed in relation to the angular speed of the rotary implements (that means a good evenness in dividing the soil into clods); the inevitable local variations in drags of the soil to tilling and to practicability of its surface, may lead to certain drawbacks. In fact, since it is practically indispensable to keep the speed of the "main" motor driving the implements, constant (by means of suitable known devices), when an increase or decrease of drag of the soil leads to a corresponding positive or negative variation in the thrust contributing to translation, the bearing wheels take up a smaller or greater amount of power, respectively, from the driving motor. This may result in a variation in the advancement speed, thus altering said relation. The numerous problems to be solved, the difficulties to be overcome and the requirements to be satisfied in this type of machines, inevitably lead, even in the best of conditions, to the provision of machines very heavy and costly, which it is desired to reduce, and of a controllability not very satisfying.

SUMMARY OF THE INVENTION

The present invention aims to eliminate all the difficulties mentioned above and solve the problems existing in prior art machines. The machine according to the present invention consists of a new self-propelled agricultural machine of the type comprising a vehicle autonomously advancing when driven, and an assembly of implements actuated by a rotary motion and capable of processing the soil during advancement of the vehicle thereon, said new machine comprising a primary source of mechanical energy (such as a heat engine), at least two transducers driven by said primary source and individually capable of transforming the mechanical energy produced thereby into independent flows of non-mechanical energy, and at least two driving means fed through independent systems, by the non-mechanical energy flows generated by said transducers, at least one of said driving means being operatively connected to means to advance said vehicle on the soil, and at least another of said driving means being operatively connected to said assembly of implements.

The transducers preferably consist in pumps, particularly hydrodynamic, hydraulic or oleodynamic pumps; and the driving means consist in fluid motors, particularly hydrodynamic, hydraulic or oleodynamic motors, fed by the pressuzied flow delivered by the pumps.

Naturally, also the motor means may be considered as transducers since they transform the non-mechanical energy flows into mechanical energy, but for the sake of clarity the word "transducers" will be used in the following description only to define the means transforming the mechanical energy supplied by the primary source into non-mechanical energy.

At least one of the transducers (and preferably all of them) is provided with means to vary the mechanical power transformed thereby according to an equal amount of mechanical power supplied by the primary source. Particularly, at least one of the transducers (and preferably all of them) may consist in a variable delivery pump. Preferably, at least one of the motor means is provided with, — besides the means to vary the power delivered by it and the speed imparted by it to the members to which it is operatively connected — also with means to vary the former without proportionately varying, or without varying at all, the latter; and this may apply particularly to the motors actuating the means used to advance the vehicle on the soil, usually wheels, so that said motors may vary the power delivered either by proportionately varying, or not proportionately varying or even by not varying at all, the advancement speed of the vehicle on the soil. It is obvious that to the power delivered by the motor means, corresponds a power taken up by them and which originates from the energy flows produced by the transducers, and therefore from the primary source of mechanical energy.

These and other important features of the invention will appear in the course of the following detailed description of some embodiments of the invention, given by way of example only and without limitation, illustrated in the accompanying drawings.

DETAILED DESCRIPTION OF THE PREFERRED EMBODIMENTS

Figure 1:
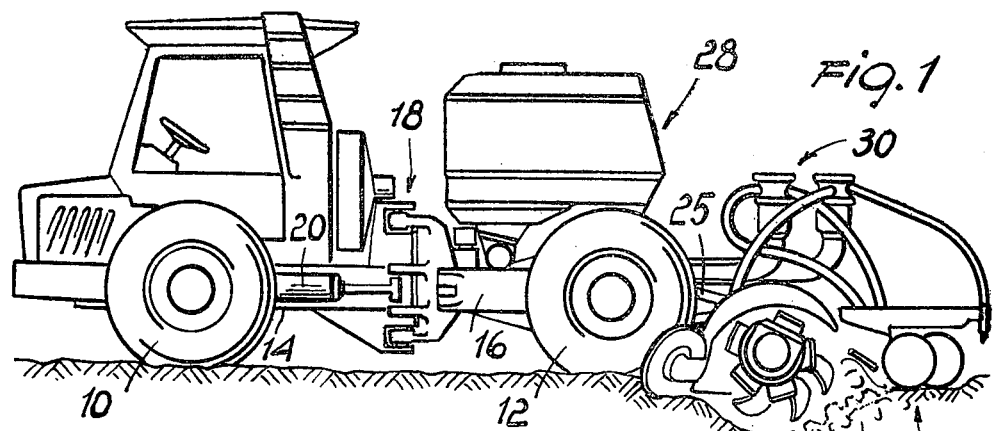
FIG. 1 is a lateral view, with numerous examples and omissions in the single structural details and the single means, mechanisms and devices, individually known in the prior art and anyway readily accessible to those skilled in the art, an agricultural machine actuated and operating according to the present invention.

The machine according to the present invention advantageously comprises a two-axes vehicle having front wheels 10 and rear wheels 12, all of which are driving wheels, and are associated to a framework so that said vehicle is like a "correct turning" type of vehicle, that means in which the rear wheels always travel along the same path of the front wheels. For instance, said framework comprises a front axle 14 and a rear axle 16, connected by means of a joint to a vertical axis 18 located at the inter-section of the quadrilateral diagonals the apices of which are defined by the bearing points of the wheels on the soil, during forward running. Obviously, steering is controlled by interlocking means, including for example hydraulic jacks 20 associated with suitable lever and connecting rod systems, as schematically shown in the drawings.

The primary power source, preferably a big internal-combustion engine 22, is mounted on the front axle 14 so as to have a rational distribution of the weights on the four wheels, while the hoe assembly 24 is mounted on an auxiliary frame 25, supported in turn so as to be lifted and lowered, for example by means of other hydraulic jacks 26, at the rear end of the rear axle 16. Said rear axle 16 also supports the tank system 20 for fertilizing agents, herbicides and so forth, which may have to be applied to the soil, and further, said rear axle 16 has associated thereto the various means 30 and 32 to complete the agricultural processing of the soil. As far as actuation, operation and possibilities relating to components 24-32 for agricultural processing of the soil reference is made to said prior Italian Patent No. 892.003.

Figure 2:
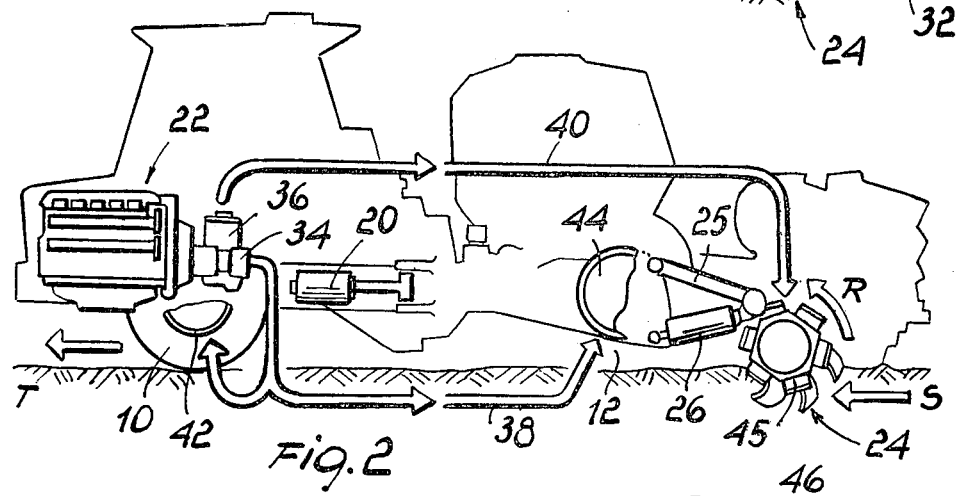
FIG. 2 is a diagrammatic view of the association of the various means for production, transformation and selective application of the power to the wheels and to the rotary implements, respectively.
Figure 3:
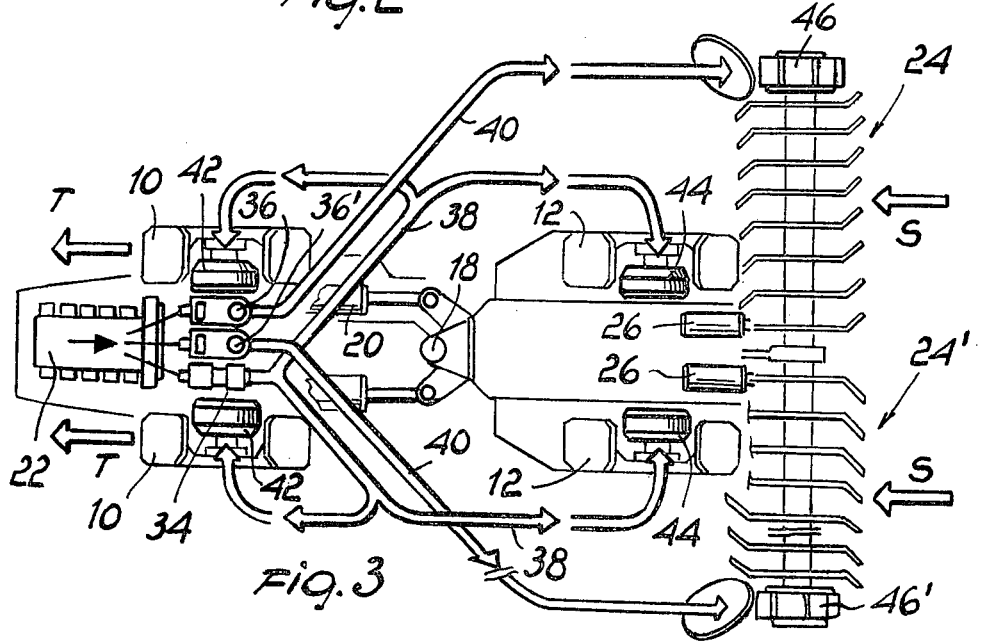
FIG. 3 is a similarly diagrammatical plan view of the arrangement of said means.

The engine 22 is connected to at least two transducers consisting in this case in two hydrodynamic pumps 34 and 35 connected by means of suitable tubes (not shown but schematically illustrated by the double-line arrows 38 and 40 respectively in FIGS. 2 and 3) to hydrodynamic motors 42 and 44, connected to the front wheels 10 and rear wheels 12, and to at least one hydrodynamic motor 46, 46' respectively, which is connected to the assembly 24 of rotary implements. Obviously also the hydrodynamic motors 46, 46' are transducers even though they are not called so for the sake of clarity in the description.

In the embodiment illustrated, the implement assembly is divided into two symmetrical units 24, 24' with respect to a vertical plane passing through the longitudinal axis of the vehicle. Each half is driven by a separate engine, and therefore in this example there are two engines 46-46' connected to the outer, right-hand and lefthand heads of the implement assembly. The implement assembly could consist in a single assembly and a single motor 46 could be provided, located, for instance at one end of the assembly. Preferably, but not necessarily, and for reasons which are readily understood, each motor 46-46' is driven by a separate pump 36-36' through a circuit 40-40', while a single pump 34 drives all motors 42, 44.

At least the hydraulic pump 34 is a variable-delivery pump, so that with the same running speed of the big internal-combustion engine 22, the vehicle may be driven, with the engine delivering the necessary power, at different advancement speeds. It is advantageous to be able to vary the delivery also of pumps 36 feeding the hydraulic motors 46 driving the hoe assembly 24; however, these pumps 36 could also be of the constant delivery type (which is much more simple and sturdy); obviously for each given rotational speed. In such a case the speed of rotation of the implement assembly 24 is determined and suitably chosen in relation to the running speed of the engine 22.

It is obvious that the power supplied at each instant by the engine 22 may be expressed in terms of the product of angular speed by the torque. Said power is transformed by the transducers, consisting in this example, in pumps 34 and 36-36', into separate hydrodynamic energy flows. On the other hand, the powers transmitted as energy flows, in hydraulic circuits 38 and 40-40', and imparted to hydraulic motors 42, 44 and 46-46', may be expressed in terms of the product of deliveres by pressures.

In the case where the power supplied by the engine 22 is transformed into electric energy flows, and the transformation means are generators or electric motors, the equivalent expressions of the product of intensity by voltage, would be adopted. The following, therefore also applies to said application of the invention which has not been described.

These powers, transformed into rotational mechanical energy by the engines, produce forces which act in the directions indicated by arrows T, R and S in FIGS. 2 and 3, i.e. the power supplied by motors 42 and 44, connected to wheels 10 and 12, ensures traction T of the vehicle and is taken up by the drag; the one supplied by motors 46-46' produces rotation R of the implement assembly and is taken up by the resistance opposed by the soil to its breakage into clods and its processing; a portion of this resistance being returned in the form of a thrust S, equal to traction T, and therefore, during the course of agricultural processing of the soil, the drag which the vehicle encounters in advancing along the soil is overcome by the sum of forces T - S, the ratio between these forces varying to the widest extent, mainly according to the nature of the soil, with an equal depth of penetration in the soil, as well as according to this depth. The hoes 24 as well as the wheels 10 - 12 must be capable of being driven or actuated as the case may be. This could be done by means of transmissions, impellers or other obvious means, but in the preferred example illustrated, it is possible to feed fluid under pressure to the two front motors 42 or the two rear motors 44 of the wheels or to all four of them or to none of them as the case may be.

During displacement of the road or off the road, when the operative assembly 24 is raised, only the pump 34, transmissions 38 or some of them, and motors 42, 44 or only two of them, are obviously in operation. All the power of motor 22 is anyway available for traction T and variation in the delivery of pump 34 enables the same to be perfectly equivalent to a traditional "gearbox" between engine and driving wheels of a vehicle.

Generally, it may be considered that the great power supplied by engine 22 largely exceeds the one necessary to overcome the drags encountered during the translating motion, but however, it is advantageous that system 34, 38, 42, 44 for transformation, transmission or retransformation of the energy, be dimensioned in such a way that to wheels 10, 12 is imparted such a force that it is possible to face any situation, be it an exceptional one or even an emergency situation.

It is now obvious that in certain circumstances, and not only during running of the vehicle on the road, it may occur that the power available from the primary energy source is excessively high with respect to that required to drive the wheels. This may occur particularly during agricultural processing of the soil, during which, as will be mentioned hereinafter, the running speed of the primary heat engine 22 has to be close to the optimum speed and therefore high.

According to a preferred, but not necessary embodiment of the invention, provision is made to vary independently, and up to a certain extent, the speed imparted to wheels 10, 12 and the power supplied and correspondingly taken up, by motors 42, 44 driving said wheels.

A very simple means to attain this, is to use as motors 42, 44 to drive the wheels, hydraulic motors with pistons, in which means are provided, which means are very simple and well known, to deactivate one or more pistons during operation. When the pump 34 is then adjusted so as to supply the hydraulic power corresponding to the requirements, this power will result in a slower or quicker translating motion according to the number of pistons operation. The power supplied and taken up by the hydrodynamic motor is indeed a function of the delivery and pressure, while by reducing the number of pistons through which flow takes place, said power is increased conversely to the speed, and therefore the speed of the wheels is decreased. Conversely, it is possible to maintain this speed constant and reduce the power supplied and taken up by deactivating a certain number of pistons. A similar result may be obtained by using instead of piston engines, with deactivatable pistons, variable-delivery rotary engines which are also known in the art.

During agricultural processing of the soil (which obviously is the main and most important use of the machine), the primary heat engine 22 is preferably constantly kept at the optimum rotating speed, as suited to big endothermic motors which are associated with known speed governors acting on feeding of the engine itself. Said engine can therefore be considered as a mechanical energy source having a constant angular speed and automatically variable torque as a function of instantaneous total drag.

According to the type of soil and agricultural processing, the variable-delivery pump 34 is adjusted so as to obtain a ratio, between advancing speed and rotational speed of the rotary implements, such as to ensure the desired "size of clods" (this parameter being well known in agriculture). Therefore, for each given adjustment, pumps 34 and 36-36' deliver a fluid (usually oil for oleodynamic transmissions) at constant deliveries, individually determining the angular speeds of all hydraulic motors 42, 44, 46-46'.

The maximum power delivered by motor 22 determines the sum of pressures simultaneously applicable to transmissions 38 and 40, independently from the distribution of these pressures in the two systems 34, 38, 42 and 44; and 36, 40-40' and 46, 46' respectively, which are totally independent, for transformation, transmission and retransformation of the power (even if the circuits for discharge, return and recycle of hydraulic fluid are common circuits). The only limitation to the power which may be used at any time, is given by the sum of the products "delivery by pressure" of the two systems and therefore, for a certain total delivery, by the sum of deliveries (by taking into account coefficients depending by the possible difference foreseen between the maximum pressures allowed in the single systems).

For instance, supposing that in certain working conditions, the thrust S resulting by operation of the implements in such that it exceeds the total drags encountered during advancement of the vehicle, that means that thrust S supplies the force required for traction T. In this case the traction motors 42, 44 do not encounter any drag, the pressure coming out of pump 34 is suppressed and said pump does not take up power from motor 22. The whole power of motor 22 is therefore applicable only to pumps 36 and 36' and thus to the rotary hoes or implements 24 the whole power may be imparted.

In the embodiment illustrated, as mentioned in the foregoing, the hoes are considered as divided into two groups 24, 24' which could be called the righthand group and the lefthand group, symmetrical with respect to a vertical plane passing through the longitudinal axis of the vehicle. Each group of hoes 24, 24' has its own motor, 46 and 46' respectively. Another two motors could be fed by a single transducer, specifically by a single hydrodynamic pump. Nevertheless, it may occur that during operation the vehicle tilts or the two groups of hoes 24, 24' find areas of land having different physical characteristics, and that therefore in order to maintain the balance of the vehicle itself and permit an efficient operation, it is necessary or inevitable to apply a higher power to that group of hoes encountering a higher drag. For this reason it has been necessary to feed each motor, 46 and 46' respectively, with a pump of its own, 36 and 36' respectively. Said pumps being variable-delivery pumps and being adjustable independently from each other, it is obvious that it is possible to feed in the circuits 40 and 40' respectively, energy flows varying according to the requirements, the only conditions being that the sum of the energy required to drive the wheels does not exceed the one supplied by the motor. It is thus possible to have a so called sort of "power differential" which has proved to be very advantageous for many types of agricultural treatments of the soil. On the other hand, it is not necessary, in general, to use motors 46 and 46' having a variable delivery or with pistons, a certain number of which can be deactivated. However, in many cases this may be advantageous and it may be considered as one of the possible preferred provisions for actuation of the present invention.

In the embodiment illustrated there are therefore four points for application of power, i.e. the pair of front wheels 10, the pair of rear wheels 12, the lefthand group of hoes 24' and the righthand group of hoes 24, respectively. Some of these powers or all of them, may be imparted at a variable speed according to the requirements. The great flexibility of operation of the machine deriving therefrom is obvious.

Supposing now for example that by processing a particularly loose soil in which the wheels 10, 12 sink to a substantial extent, a high force T is necessary for advancement, and that in view of the nature of the soil, this offers a rather low drag to rotation R of the implements the result, as a first consequence is that also the thrust S contributing to advancement is quite low. In this case, a substantial amount of power has to be imparted to motors 42, 44 and the value of the outlet pressure from pump 34 is high. Since the total maximum outlet pressure from the assembly of pumps 34, 36, 36' cannot be exceeded (it being limited by the maximul torque supplied by motor 22) the maximum pressure applicable to transmission 40, 40' is correspondently limited, and only a more or less substantial portion of the power installed is available to actuate the hoes or implements 24, 24'.

On the other hand, as already mentioned, in these working conditions, the implements 24, 24' encounter a proportionately small drag in their rotation R and said portion available of the power installed is sufficient to ensure said rotation. In certain conditions it is also desirable to completely lift the hoes 24, 24' by suppressing the supply of power thereto, and imparting all possible power to wheels 10, 12 generally by actuating the pump 34 as well as motors 42, 44 in conditions of maximum delivery.

In conditions where the soil is hard, the situation differs because the hoes 24, 24' encounter a much higher drag, but on the other hand produce a very high thrust and consequently the power required by the wheels 10, 12 is smaller: in these conditions the wheels even act as speed regulators by aiding advancement or even braking it according to oscillations of the thrust of hoes 24, 24' about an optimum mean value. The size of the clods will naturally be suited to the characteristics of the soil and will tend to be smaller the harder it is to process the soil.

What has been mentioned in the foregoing particularly relates to operation of the machine as a cultivator, that is with delivery of fertilizers, seeds, chemical agents and so forth, as shown in FIG. 1. Said operation requires the need of a tank which, with its weight, is a burden mainly on the rear axle, but, except in the case where the axle itself sinks in a particularly soft soil, all the thrust of the hoes 24, 24' is available to advance the vehicle and when the soil is not too soft it helps considerably the advancement of the vehicle or even it entirely determines same.

Figure 5:
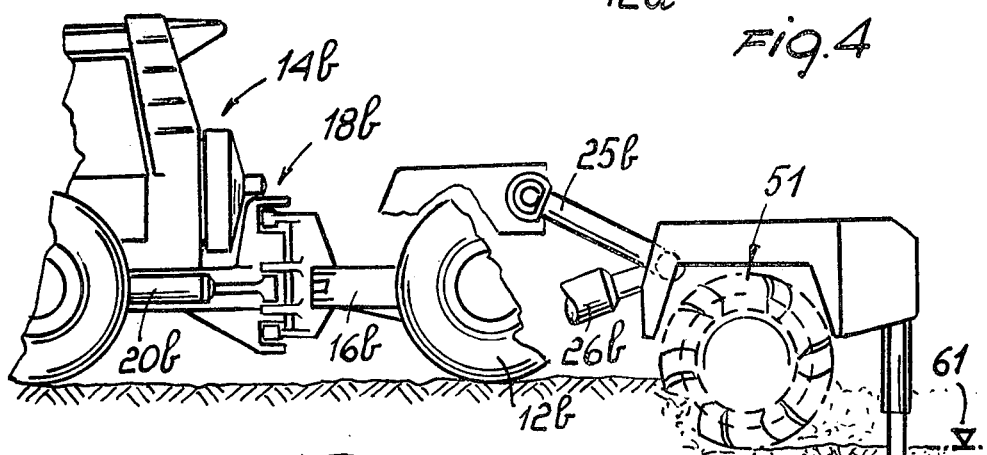
FIG. 5 is a view similar to FIG. 1, the rear portion of a third embodiment of the present invention.
Figure 6:
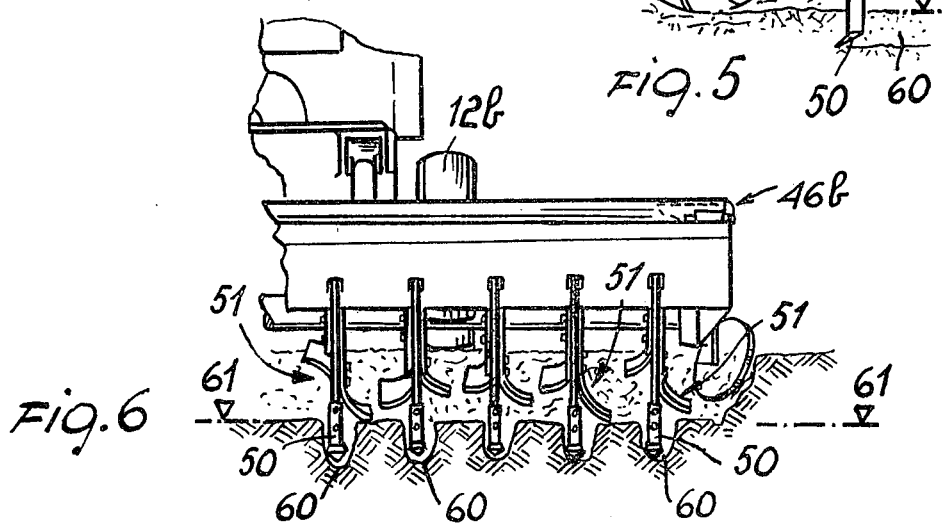
FIG. 6 is a partial elevational view of the rear portion of the embodiment shown in FIG. 5.

The situation differs when the machine is used as a hoe deeply penetrating into certain soils. This type of application is shown in FIGS. 5 and 6. In this case the hoes have a much larger diameter and behind it are applied implements which may be called knives, and are essentially vertical and generally placed one on the axis of each hoe, and extend to a depth higher than the depth to which the hoes penetrate. The function of said devices is to break the smooth surface which in certain soils may be broken by the action of the hoes, thus facilitating discharge of waters. This function thereof therefore does not concern the present invention. What matters to the present invention, is that said implements have to break the soil by means of the dragging action of the machine and consequently produce a very high passive resistance.

In FIGS. 5 and 6 the parts similar to those shown in FIGS. 1 and 2 have been indicated by the same reference numbers with the addition of a b. The knives mentioned above have been indicated at 50. In FIG. 6 are shown the furrows 60 which they produce in the soil below the level 61 of said implements. The implements of larger diameter used for this application are indicated at 51 in figures 5-6.

This type of processing usually does not take place on very soft soils. The sum of drags encountered by the hoes 51 and knives 50 during their operation is very high, and therefore the thrust produced by the hoes generally scarcely compensates these drags and at times it does not succeed in doing so. Drawing of the vehicle in these cases depends entirely on the wheels. In these conditions the vehicle operates with such a balance of powers and speeds that the wheels receive a substantial portion of the power developed by the primary motor, but at the same time they rotate rather slowly to produce a size of clod small enough, so that the sum of all the powers required does not exceed the one that may be supplied by the primary motor. In these operating conditions, it is particularly essential to be able to reduce the advancement speed of the vehicle, while the motors of the wheels are fed with all the high power required to draw the vehicle and to overcome the drags that the thrust of the hoes is not capable of balancing.

Figure 4:
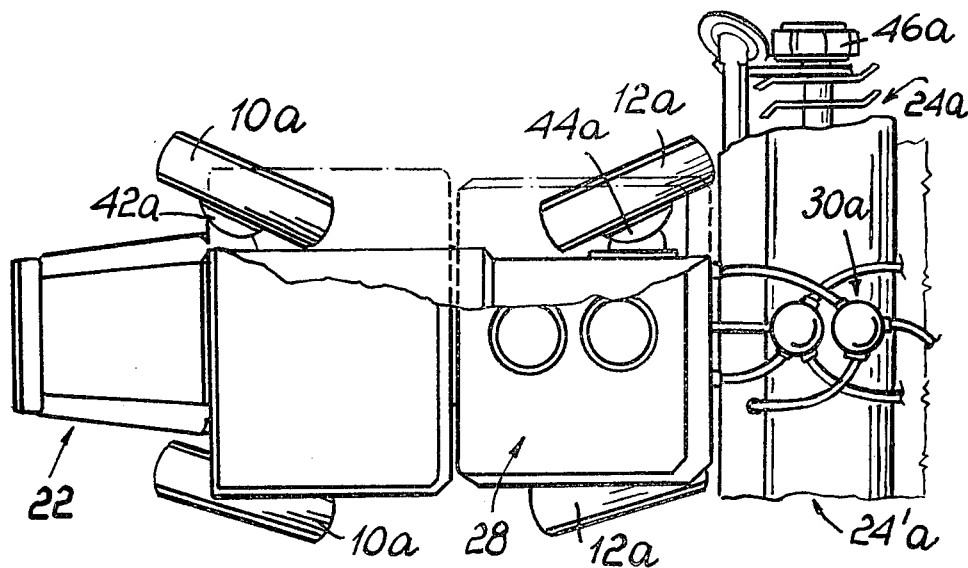
FIG. 4 is a fragmentary view, in a plan view and a partial horizontal section, another embodiment of the present invention.

FIGS. 4 shows a variation of the invention wherein — the vehicle is not an articulated type of vehicle but is provided with steering wheels, and the portions similar to those shown in FIGS. 1 to 3 are indicated with the same reference numbers with the addition of an a. The hydraulic circuits shown, relating to the examples of FIGS. 4, 5 and 6 are to be considered similar to those shown in FIGS. 2 and 3. It is obvious that also these circuits may be varied in many ways and also the number of pumps and motors indicated are not binding and besides the mechanical variations that a person skilled in the art may make to the embodiment of the invention, many hydraulic variations are also possible, and it is also possible to use different types of transducers and motors than the ones shown.

When the transducers produce hydrodynamic energy and this is transferred to the motors, it is necessary to provide suitable control means also for the pressure generated in the hydraulic circuits. The first requirement is to have safety valves to prevent damage to the equipment. Nevertheless, the safety valves cannot be calibrated to a pressure corresponding to the maximul power supplied by the motor in balanced conditions of operation, that means in conditions where the power flow is sufficiently distributed in the various transmissions. For the sake of explanation, the ratio which may exist for example in the embodiments illustrated, between the righthand group of hoes and the lefthand one, is to be considered. By considering in a certain machine the pressure corresponding to the maximum power which may be taken up in practical conditions by the hoes, it could be believed that it is possible to calibrate the safety valves so that they open when that pressure is exceeded. However, this could be a drawback because, as mentioned in the foregoing, the machine may be in such conditions that one group of hoes doe little work or none at all, while the other group is overloaded. In this case, in order to supply the group of hoes in operation, with the necessary power, the pressure in the circuit must be allowed to increase above the theoretical maximum value. Therefore, the safety valves protecting the equipment against damage generally do not prevent that the power required at the primary motor exceeds the limit that the primary motor can supply in optimum operating conditions. In such a case, the operator will note this excessive power requirement by the motor and will take the necessary steps accordingly by modifying the attitude of the maching in such a way to reduce the power required within acceptable limits; or suitable automatic means will replace the operator.

The various parameters and ratios between the partial powers which may be distributed, may vary within wide limits acceptable in practice, and the machine is spontaneously and automatically capable to distribute the energy supplied by its primary source (motor 22) to the means using this energy, to a degree and in the ratios resulting from the instantaneous drags encountered by said means, and at the same time, taking up from said primary source, at any time, only the energy required to overcome the sum of these drags (which has the result of enabling a complete and rational use of the fuel fed to the motor).

Bearing in mind that the only limitation to the performance of the machine is given by the maximum value of the power installed, the machine may readily be suited (for instance by limiting penetration of operation and/or advancing speed) to particularly hard conditions, for example for processing of particularly difficult soils, on sloping fields, and so forth, to its association with other equipment and devices taking up the mechanical energy and using or not other hydraulic motors, fed by branches of circuit 38 or circuit 40, or any other suitable circuit fed by a third pump which, in such a case, takes up a fraction of the power installed.

The machine according to the present invention lends itself particularly for integration with suitable automatisms and interlocking devices. The total instantaneous power supplied may be signalled for example by an integrating manometric system which, at the various deliveries, signals the approach to the limit of deliverable power, or the like.

I claim:

1. An agricultural self-propelled machine including a vehicle capable of autonomously advancing when driven and an assembly of implements actuated with a rotary motion and capable of processing the soil during advancement of the vehicle thereon comprising: a primary source of mechanical energy, at least two transducers having inputs connected to said primary source and individually capable of transforming the mechanical energy produced thereby into independent non-mechanical energy flows and having outputs connected to separate power flow channels, and at least two driving means fed through channels with the non-mechanical energy flows produced by said transducers, at least one of said driving means being operatively connected to means to advance said vehicle on the soil, and at least another of said driving means being operatively connected to said assembly of implements, and wherein at least one of the driving means is provided with means to vary the power supplied thereby, and the speed imparted thereby to the members to which it is operatively connected, and also with means to vary the former without proportionately varying, or without varying at all, the latter.

2. A machine as claimed in claim 1, wherein at least one of the transducers consists of a variable-delivery pump.

3. A machine as claimed in claim 1, wherein only the driving means operatively connected with means to advance the vehicle, are provided with means to vary the power supplied thereby and the speed to advance the vehicle and also with means to vary the former without proportionately varying, or without varying at all, the latter.

4. A machine as claimed in claim 1 and including a wheeled vehicle, wherein the driving means operatively connected with at least a portion of the driving wheels, are fluid motors keyed directly onto the axes of the respective wheels.

5. A machine as claimed in claim 4 wherein at least a portion of the wheels is selectively connectable to and respectively detacheable from the respective driving means, or are connected thereto, enabling however to connect or switch-off at will, feeding of each of said driving means from the respective transducers.

6. A machine as claimed in claim 4, wherein the vehicle consists in an articulated unit, including a front axle and a rear axle, each carrying at least a pair of bearing and driving wheels, and articulated with each other by means of a cardan joint system and steering means capable of imparting relative displacements between said front axle and rear axle, about a vertical axis belonging to said joint so as to ensure conditions of "correct turning" during running of the vehicle.

7. A machine as claimed in claim 6, wherein the primary power source and the transducers are mounted on said front axle, and the implements are mounted on a secondary frame connected to the rear portion of said rear axle.

8. A machine as claimed in claim 4, wherein the vehicle comprises a frame provided with steering front wheels.

9. A machine as claimed in claim 1, wherein the implements are divided into at least two groups symmetrical with respect to a vertical plane passing through the longitudinal axis of the machine, and each group is actuated by at least a separate driving means, the driving means actuating each of said groups being fed by a separate transducer.

10. A machine as claimed in claim 1, wherein the mechanical energy primary source is carried by the rear of the vehicle and the implements are mounted on a secondary frame connected to the rear portion of the vehicle so as to be raised and lowered.

11. A machine as claimed in claim 10, comprising tanks for the liquid used for treatment of the soil, carried by the vehicle in an intermediate position between the primary energy source and the area where the secondary frame is coupled to the vehicle.

12. An agricultural self-propelled machine consisting of a vehicle capable of autonomously advancing when driven, and an assembly of implements actuated with a rotary motion and capable of processing the soil during advancement of the vehicle thereon, comprising a primary source of mechanical energy, at least two transducers having inputs connected to said primary source and individually capable of transforming the mechanical energy produced thereby into independent non-mechanical energy flows and having outputs connected to separate power flow channels, and at least two driving means fed through channels with the non-mechanical energy flows produced by said transducers, at least one of said driving means being operatively connected to means to advance said vehicle on the soil, and at least another of said driving means being operatively connected to said assembly of implements, said transducers comprising pumps and said driving means comprising a fluid motor fed by the pressurized fluid delivered by said pumps through said channels, wherein at least the driving means to advance the vehicle comprises a variable delivery fluid motor.

13. A machine as claimed in claim 12 wherein at least one of variable-delivery fluid motors is a hydrodynamic piston motor provided with means to deactivate one or more of the pistons.

* * * * *